(12) United States Patent
Ramirez Muela et al.

(10) Patent No.: US 11,235,531 B2
(45) Date of Patent: Feb. 1, 2022

(54) SELECTING A TASK IN ADDITIVE MANUFACTURING (71) Applicant: HEWLETT-PACKARD DEVELOPMENT COMPANY, L.P., Houston, TX (US)

(72) Inventors: David Ramirez Muela, Barcelona (ES); Sergio Puigardeu Aramendia, Barcelona (ES); Salvador Sanchez Ribes, Sabadell (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 305 days.

(21) Appl. No.: 16/095,595

(22) PCT Filed: May 12, 2016

(86) PCT No.: PCT/EP2016/060706
§ 371 (c)(1),
(2) Date: Oct. 22, 2018

(87) PCT Pub. No.: WO2017/194127
PCT Pub. Date: Nov. 16, 2017

(65) Prior Publication Data
US 2019/0091937 A1 Mar. 28, 2019

(51) Int. Cl.
*B29C 64/393* (2017.01)
*B33Y 50/02* (2015.01)
(Continued)

(52) U.S. Cl.
CPC ............ *B29C 64/393* (2017.08); *B22F 10/20* (2021.01); *B28B 1/001* (2013.01); *B29C 64/386* (2017.08);
(Continued)

(58) Field of Classification Search
CPC ... B29C 64/393; B29C 64/386; B29C 64/129; B29C 64/118; B33Y 10/00; B33Y 30/00;
(Continued)

(56) References Cited

U.S. PATENT DOCUMENTS

2001/0045678 A1  11/2001  Kubo et al.
2007/0071462 A1*  3/2007  Koitabashi ............ G06F 3/1231
                                          399/23
(Continued)

FOREIGN PATENT DOCUMENTS

CN  103384591 A  11/2013
EP  2433778      3/2012
(Continued)

OTHER PUBLICATIONS

International Search Report and Written Opinion for International Application No. PCT/EP2016/060706 dated Jan. 31, 2017, 13 pages.
(Continued)

*Primary Examiner* — Thomas C Lee
*Assistant Examiner* — Ameir Myers
(74) *Attorney, Agent, or Firm* — HP Inc. Patent Department (57) ABSTRACT In an example, a method of controlling an additive manufacturing apparatus to generate a three dimensional object comprises processing successive layers of build material so as to form successive layers of a three dimensional object, wherein the processing of each layer is performed within a predetermined layer processing time by a plurality of components. The method may further include selecting, by at least one processor, from a plurality of ancillary tasks, at least one ancillary task to be performed in relation to at least one component of the plurality of components. The method may further include scheduling, by at least one processor,
(Continued)

the at least one ancillary task to be performed in relation to the at least one component within the predetermined layer processing time for a single layer or for multiple layers of the build material.

14 Claims, 4 Drawing Sheets

(51) Int. Cl.
| | |
|---|---|
| *B29C 64/386* | (2017.01) |
| *G05B 19/4099* | (2006.01) |
| *B22F 10/20* | (2021.01) |
| *B33Y 10/00* | (2015.01) |
| *B33Y 30/00* | (2015.01) |
| *B33Y 40/00* | (2020.01) |
| *B28B 1/00* | (2006.01) |
| *B22F 10/30* | (2021.01) |
| *B29C 64/129* | (2017.01) |
| *B28B 17/00* | (2006.01) |

(52) U.S. Cl.
CPC .............. *B33Y 10/00* (2014.12); *B33Y 30/00* (2014.12); *B33Y 40/00* (2014.12); *B33Y 50/02* (2014.12); *G05B 19/4099* (2013.01); *B22F 10/30* (2021.01); *B22F 2999/00* (2013.01); *B28B 17/0081* (2013.01); *B29C 64/129* (2017.08); *Y02P 10/25* (2015.11)

(58) Field of Classification Search
CPC ....... B33Y 40/00; B33Y 50/02; B22F 3/1055; B22F 2003/1057; B22F 2999/00; B22F 3/0081; B28B 1/001; B28B 17/008; G05B 19/4099; G05B 2219/49007; Y02P 10/25

See application file for complete search history.

(56) References Cited

U.S. PATENT DOCUMENTS

| | | |
|---|---|---|
| 2008/0131540 A1 | 6/2008 | Perret et al. |
| 2015/0057784 A1 | 2/2015 | Butler et al. |
| 2015/0086409 A1 | 3/2015 | Hellestam |
| 2015/0298394 A1 | 10/2015 | Sheinman |
| 2016/0311171 A1* | 10/2016 | Bradway ............... B33Y 10/00 |

FOREIGN PATENT DOCUMENTS

| | | |
|---|---|---|
| EP | 3002108 A1 | 4/2016 |
| EP | 3112136 A2 | 1/2017 |
| WO | WO 2012070053 | 5/2012 |
| WO | WO 2014193311 | 12/2014 |
| WO | WO 2016053303 | 4/2016 |

OTHER PUBLICATIONS

"Mojo 3D Printer—User Guide", Stratasys Inc., 2013, 66 pages.

* cited by examiner

SELECTING A TASK IN ADDITIVE MANUFACTURING

BACKGROUND

Additive manufacturing techniques may generate a three-dimensional object on a layer-by-layer basis through the solidification of a build material. In examples of such techniques, build material is supplied in a layer-wise manner and a solidification method may include heating the layers of build material to cause melting in selected regions. In other techniques, other solidification methods, such as chemical solidification methods or binding materials, may be used.

An additive manufacturing system may include components in relation to which tasks may be performed before, during or after the system is used to generate a three-dimensional object.

BRIEF DESCRIPTION OF DRAWINGS

Examples will now be described, by way of non-limiting example, with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In addition to a fusing agent, in some examples, a print agent may comprise a coalescence modifying agent (referred to as modifying or detailing agents herein after), which acts to modify the effects of a fusing agent for example by reducing or increasing coalescence or to assist in producing a particular finish or appearance to an object, and such agents may therefore be termed detailing agents. A coloring agent, for example comprising a dye or colorant, may in some examples be used as a fusing agent or a modifying agent, and/or as a print agent to provide a particular color for at least a portion of the object. In other examples, a print agent may comprise a coalescence modifying agent, or detailing agent, but no fusing agent.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

An example additive manufacturing apparatus may include a print bed, or build platform, onto which a layer of build material may be formed. The additive manufacturing apparatus may also include a build material distributor to distribute or form build material on the print bed. In some examples, the additive manufacturing apparatus may include at least one source of radiation to direct radiation towards the print bed. The source of radiation may comprise at least one heat lamp, such as an infrared lamp, which may be positioned above the print bed such that radiation is directed downwards towards the print bed. The source of radiation may, in some examples, include at least one pre-heating lamp for pre-heating the build material and/or at least one fusing lamp for applying heat to fuse portions of the build material. The additive manufacturing apparatus may also include an agent distributor to distribute agent, such as fusing agent and/or detailing agent, onto the layer of build material formed on the print bed. The agent distributor may include at least one set of nozzles through which the print agent may be distributed onto the build material, each set of nozzles having at least one individual nozzle. The nozzles and/or the sets of nozzles may form part of a print head which, in some examples, may be a thermal print head or a piezo print head. The agent distributor may be movable relative to the print bed such that print agent may be selectively deposited, for example drop-by-drop, onto a portion of the layer of build material in a pattern derived from data representing a slice of the three-dimensional object to be built.

The agent distributor may be movable at least in a plane parallel to the print bed between a rest configuration, in which the agent distributor can be considered inactive or idle, and an active configuration, in which the agent distributor can distribute the print agent in accordance with the pattern.

A period of time during which the agent distributor distributes print agent onto the layer of build material or moves into position over the print bed, or build platform, can be considered to be an 'active period' of the agent distributor. A period of time during which the agent distributor is in the rest position and is inactive, can be considered to be an 'inactive period' of the agent distributor. More generally, when a component of the additive manufacturing apparatus is functioning in relation to generating object or a layer of an object to be generated, then the component can be considered as being active. When a component is not functioning in relation to generating object or a layer of an object to be generated, for example, when the component is at rest, or idle, then the component can be considered as being inactive.

Figure 1:
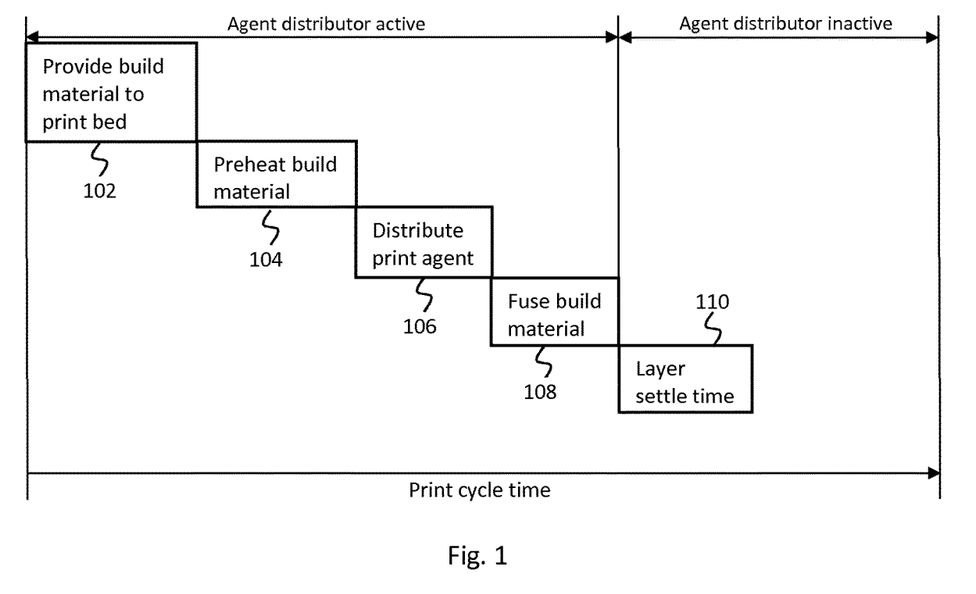
FIG. 1 is a simplified schematic flow diagram of an example additive manufacturing process.

FIG. 1 is a simplified schematic flow diagram of an example additive manufacturing process. In block 102, a layer of build material may be formed onto a print bed. The layer of build material may be formed using, for example, a build material distributor, which may deposit and spread build material onto the print bed at an intended thickness. The layer of build material may be preheated in block 104. Preheating the build material increases the temperature of the layer of build material so as to reduce the amount of power to be used subsequently by the at least one fusing lamp to fuse portions of the build material. Pre-heating may be achieved using a radiation source such as an infrared lamp, as discussed above, or by some other means. In block 106, print agent may be distributed onto the layer of build material by the agent distributor. Energy, for example heat from the at least one fusing lamp, may be applied to the layer of build material in block 108, so as to cause coalescence and solidification of those portions of build material to which fusing agent has been applied. In block 110, the layer of build material may be allowed to settle and cool down.

The processes described above with reference to blocks 102 to 110 form part of a layer processing cycle which may be repeated for each layer of the multi-layered object to be generated. The layer processing cycle, or layer generation cycle, may be considered to include a set of processes performed in respect of a single layer of build material so as to form a slice of the three-dimensional object to be built, and the time to perform the set of processes in respect of a single layer of build material may be considered to be a layer processing time, or layer generation time.

It is intended that the layer processing time, in some examples, may be the same or approximately the same for all of the layers of an object to be generated. That is to say, the layer processing time for each layer in an additive manufacturing process may be predetermined to an approximately constant or fixed duration, and does not vary between layers of build material. Here, the expression "the same" is intended to mean exactly the same or approximately the same. In some examples, the predetermined layer processing time for each of the layers may be set to a particular intended time which may be the same, within a predetermined tolerance, for all layers, and which may be determined prior to the commencement of the generation process, as discussed below. In some examples, the predetermined tolerance may plus or minus ten percent of a predetermined intended time. In other examples, the predetermined tolerance may plus or minus five percent of a predetermined intended time.

A variation in processing times for individual processes between different layers may, for example, cause heating profiles in the build material to vary between layers. For example, if a particular process of the layer processing cycle is shorter or omitted altogether for a particular layer, then the amount of heat applied to the build material of that layer, both from the pre-heating process and from the fusing process may be different compared to other layers. Such differences may cause unintended local heat fluctuations in the build material of other layers of build material. A variation in processing times of individual processes in different layers might also cause a variation in the total processing time for different layers. If the layer processing time for a particular layer in an additive manufacturing process is too long relative to the intended constant layer processing time, for example if a layer of build material is heated up by a heat lamp for too long during a pre-heating process, then the build material may become hotter than intended, and a portion of build material may be caused to fuse or coalesce, even if fusing agent has not been applied to that portion. If heat from a heating lamp causes fusing of portions of the build material that are not intended to fuse, then the resulting object may, for example, include an artefact or mechanical defect. Maintaining a constant or approximately constant layer processing time for all layers of an object to be generated helps to ensure that the object is generated with consistent layers.

While the processes described above with reference to blocks 102 to 110 are performed, at least one component of the additive manufacturing apparatus may be considered to be active while others may be considered to be inactive, or idle. During the process described above with reference to block 110, for example, the agent distributor may be inactive. The agent distributor may also be inactive while build material is formed on the print bed, or during the pre-heating process, for example. Thus, for a particular layer, at least some components of the additive manufacturing apparatus may be inactive for at least a period of time during the layer processing cycle. The time taken to perform the processes described above with reference to blocks 102 to 110 may be shorter for some layers than for other layers and, therefore, the inactive period of those components of the additive manufacturing apparatus may be shorter for some layers than for other layers.

Figure 2:
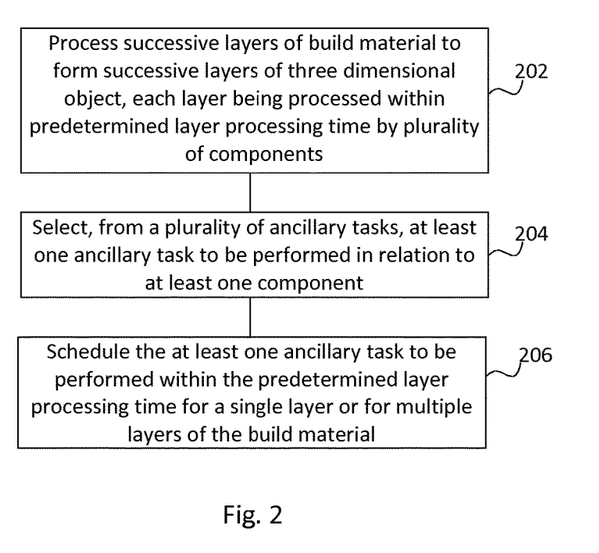
FIG. 2 is a flowchart of an example method of scheduling a task to be performed.

FIG. 2 is an example of a method of controlling an additive manufacturing apparatus to generate a three dimensional object comprising, in block 202, processing successive layers of build material so as to form successive layers of a three dimensional object, wherein the processing of each layer is performed within a predetermined layer processing time by a plurality of components. The components may comprise components of an additive manufacturing apparatus used to process layers of build material as part of a layer processing cycle as discussed above.

Block 204 comprises selecting, by at least one processor, from a plurality of ancillary tasks, at least one ancillary task to be performed in relation to at least one component of the plurality of components. The at least one processor may be a processor of the additive manufacturing apparatus, or a processor of a computing device or server connected to or remote from the additive manufacturing apparatus. The plurality of ancillary tasks to be performed in relation to the at least one component may, in some examples, be maintenance tasks or operations to be performed to the at least one component. The terms "task" and "ancillary task" used herein are intended to include any supplemental or auxiliary tasks performed separately from, and in addition to, any tasks that may be performed as a part of the layer processing cycle as discussed herein. For example, the plurality of ancillary tasks may include at least one of the following: actively cooling an agent distributor of the additive manufacturing apparatus, performing a wiping procedure on at least one nozzle of an agent distributor of the additive manufacturing apparatus performing a drop spitting procedure on at least one nozzle of an agent distributor of the additive manufacturing apparatus, performing a drop detection procedure on at least one nozzle of an agent distributor of the additive manufacturing apparatus, priming an agent distributor of the additive manufacturing apparatus, priming at least one nozzle of an agent distributor of the additive manufacturing apparatus, and performing a cleaning procedure to a build material distributor of the additive manufacturing apparatus. The plurality of ancillary tasks may include at least one other task not mentioned above which may or may not be considered maintenance tasks.

The method further comprises, in block 206, scheduling, by at least one processor, the at least one ancillary task to be performed in relation to the at least one component within the predetermined layer processing time for a single layer or for multiple layers of the build material. That is to say, the method determines which ancillary task or tasks are to be performed to or by at least one of the components, and plans when particular ancillary tasks are to be performed. The scheduling is done so that the intended tasks can be performed within the predetermined layer processing time, and the tasks are planned so that the predetermined layer time is not affected by the tasks to be performed. While some ancillary tasks may be scheduled to be performed within the predetermined layer processing time of a single layer of build material, others may be scheduled to be performed during the processing of multiple layers of build material. However, for each layer of build material, the predetermined layer processing time is not affected by the scheduled ancillary tasks.

In some examples, an additive manufacturing apparatus may include a cooling subsystem or cooling station to actively reduce a temperature of at least one component of the additive manufacturing apparatus, such as, for example, the agent distributor. In some examples, the temperature of the agent distributor may increase during use, and this increase in temperature may affect the temperature of the print agent being distributed by the agent distributor. The active cooling subsystem may therefore be used to reduce the temperature of the agent distributor. The active cooling subsystem may include at least one fan to direct relatively cooler air towards the relatively warmer agent distributor. In other examples, the active cooling subsystem may include alternative means for reducing the temperature of the agent distributor, such as a heat exchange system or a fluid bath.

An additive manufacturing apparatus may, in some examples, include a drop spitting subsystem or drop spitting station to perform a drop spitting procedure on at least one nozzle of the agent distributor. Such a spitting subsystem may include a spitting tray to catch print agent dispensed from at least one of the nozzles during a drop spitting procedure. In other examples, the additive manufacturing apparatus may include a wiping subsystem or wiping station to perform a wiping procedure on at least one nozzle of the agent distributor. Such a wiping subsystem may include a wiping element to wipe excess or residual print agent from at least one nozzle of the agent distributor.

Some examples of an additive manufacturing apparatus may include a drop detection subsystem or drop detection station to perform a drop detection procedure on at least one nozzle of the agent distributor. The drop detection subsystem may include a detector to be positioned beneath a nozzle of the agent distributor to detect a drop of print agent dispensed from the nozzle. Other examples of the additive manufacturing apparatus may include a priming subsystem or priming station to prime the agent distributor or at least one of the nozzles of the agent distributor. As understood herein, "priming" the agent distributor or at least one nozzle of the agent distributor is considered to mean removing a particle, such as a particle of build material, fluid, such as print agent, or mass from the agent distributor or at least one nozzle in preparation for distributing print agent.

In some examples, the additive manufacturing apparatus may include a cleaning subsystem to perform a cleaning procedure to a build material distributor, or to the print bed of the additive manufacturing apparatus. Build material may, for example, accumulate on the build material distributor, and a cleaning procedure may be performed to clean the build material distributor. In some examples, the cleaning subsystem may perform a cleaning procedure on at least one other components of the additive manufacturing apparatus.

At least one ancillary task, which may include at least one of the tasks described above, may be performed at least one component of the additive manufacturing apparatus during an inactive period of the at least one component. That is to say, at least one of the ancillary tasks may be performed while the at least one component is not functioning in relation to the generation of an object. In an example in which the at least one component comprises and agent distributor, at least one of the ancillary tasks may be performed while the agent distributor is not distributing print agent onto the layer of build material, or moving into position over the print bed.

In some examples, the selection of an ancillary task to be performed may be based at least in part on data relating to the three dimensional object to be generated. The data may be object model data representing at least a portion of the object to be generated by the additive manufacturing apparatus by fusing portions of build material. The data may be provided to the additive manufacturing apparatus or to a processor thereof prior to the start of the manufacturing process and may be provided, for example, by a designer. The data may, for example, comprise a Computer Aided Design (CAD) model, and/or may be a STereoLithographic (STL) data file. In some examples, the data may in at least one of the following formats: Extensible Markup Language (XML), Virtual Reality Modeling Language (VRML), object (OBJ), Additive Manufacturing File Format (AMF), and 3D Manufacturing Format (3MF). In other examples, the data may be in another format.

The data may, for example, include information describing at least one of the following: a size of at least a portion of the object to be generated, a shape of at least a portion of the object to be generated, a dimension of the object to be generated, a size of at least a portion of the layer of build material used to generate a slice of the object, a shape of at least a portion of the layer of build material used to generate a slice of the object, and an amount of print agent to be distributed onto at least a portion of a layer of build material.

In order to determine the layer processing time within which to process each layer of build material, the at least one processor may, in some examples, determine the time to perform a processing cycle for the layer of an object in which the greatest amount of energy is used to fuse the build material. The processing cycle time may then be fixed for all layers based on the layer having the longest processing cycle time. In some other examples, the processing cycle time may be determined based on the amount of print agent to be distributed and, in some other examples, the processing cycle time may be selected or determined in another way, for example by a user. Once the fixed processing cycle time has been determined, the at least one processor may determine, for each layer, the amount of time during the processing cycle time that a component or various components of the additive manufacturing apparatus such as, for example, the agent distributor, will be inactive. The at least one processor may determine which ancillary task or tasks are to be performed in relation to the component or components (for example the agent distributor), and generate a schedule describing when they are to be performed.

It may not be intended to perform particular ancillary tasks in relation to the at least one component during every layer processing cycle. Therefore, the at least one processor may schedule ancillary tasks to be performed at particular stages in the object generation process such that some tasks are performed during some processing cycles and other tasks are performed during other processing cycles, as discussed below. In some examples, it may not be possible to complete a particular ancillary task during the inactive period of the at least one component of a single layer processing cycle. In such examples, the at least one processor may split or divide the ancillary task into multiple portions as will be discussed below with reference to FIGS. 3 and 4.

Figure 3:
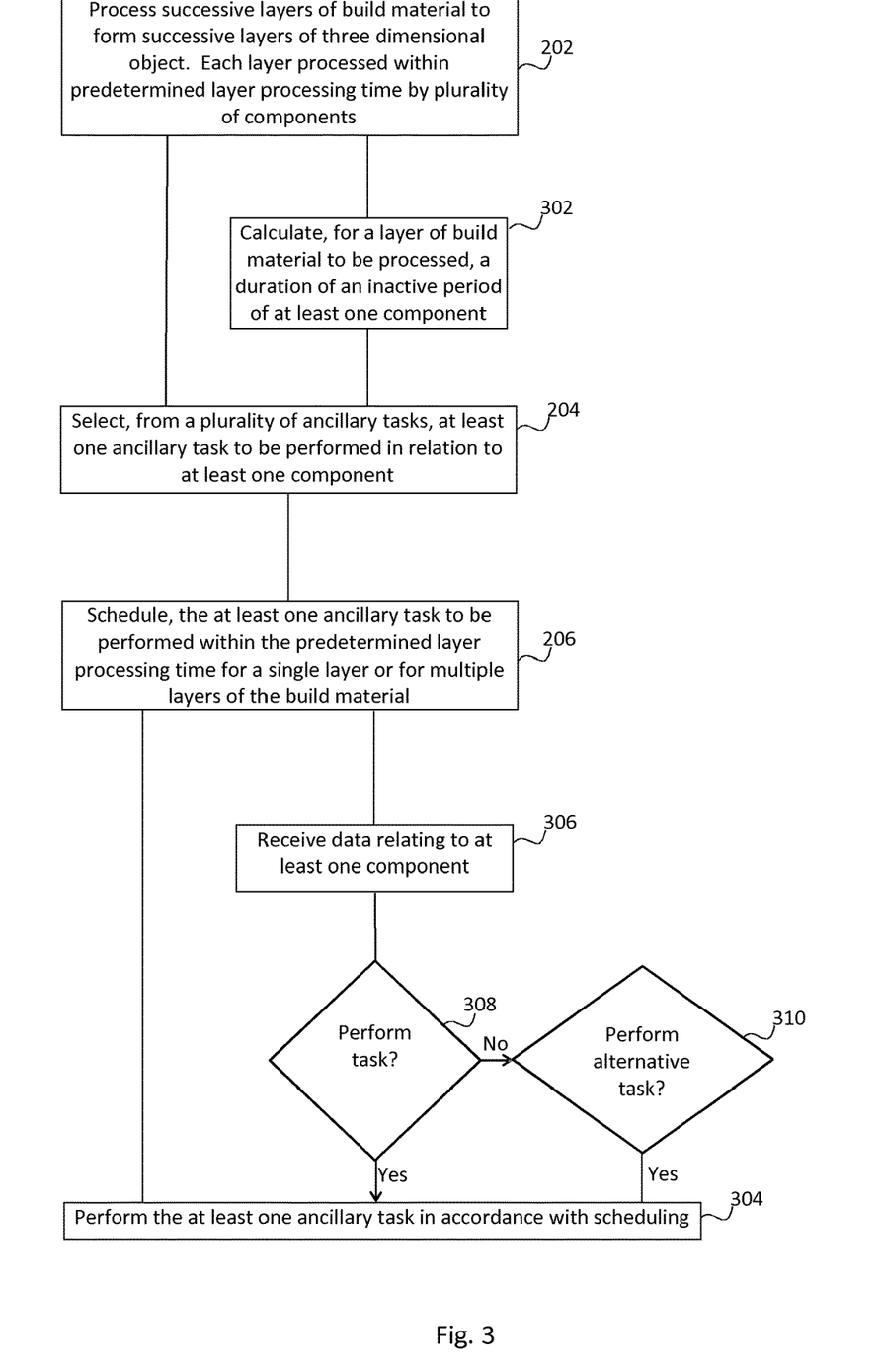
FIG. 3 is a flowchart of an example method of performing a task.

FIG. 3 is an example of a method comprising the processes discussed above with reference to blocks 202 to 206. In some examples, each component may perform a function in relation to processing a layer of build material during an active period of the component. The scheduling of block 206 may comprise scheduling the at least one ancillary task to be performed during an inactive period of the component. The method may further comprise, in block 302, calculating, by at least one processor, for a layer of build material to be processed, a duration of said inactive period and selecting the ancillary task based at least in part on the calculated duration. Thus, the selection made in block 204 may be based at least in part on the calculated duration.

In some examples, the method may comprise performing the at least one ancillary task in accordance with said scheduling, as in block 304.

In some examples, the method may, following the scheduling of block 206, comprise receiving data relating to at least one component, as described in block 306. In some examples, the received data may relate to the agent distributor during an active period or during an inactive period. Such data may, for example, include data relating to a drop detection procedure performed during an inactive period, data relating to a temperature measurement of the agent distributor, and/or data obtained from at least one other procedure carried out in relation to the agent distributor. In other examples, the received data may relate to the build material distributor and/or to the print bed. Such data may, for example, relate to an amount of build material present on the build material distributor and/or the print bed, and may be indicative of whether or not a cleaning procedure should be performed.

In block 308, the method may comprise determining, by at least one processor, based at least in part on data received in block 306, whether the ancillary task selected in block 204, is to be performed. In some examples, if data received in block 306 indicates that the selected or scheduled ancillary task should not be performed, then the processor may not perform the ancillary task. If the processor determines that the ancillary task is to be performed, then the ancillary task is performed within the predetermined layer processing time, as in block 304, discussed above. If, however, the processor determines that the ancillary task is not to be performed, then the method comprises, in block 314, determining whether an alternative ancillary task is to be performed. For example, the processor may schedule a priming procedure to be performed on a second set of nozzles of the agent distributor during a particular layer processing cycle. If data is received from a drop detection procedure that indicates that the first set of nozzles should be primed, then the processor may determine at block 308, that the scheduled ancillary task (for example priming the second set of nozzles) is not to be performed, and it may be determined, at block 310, that an alternative ancillary task (for example priming the first set of nozzles) is to be performed instead. In other words, in response to a determination that the selected ancillary task is not to be performed, then the method may comprise determining whether an alternative ancillary task is to be performed. In this way, the process can alter or update the scheduled ancillary tasks in real time, during the additive manufacturing process.

Figure 4:
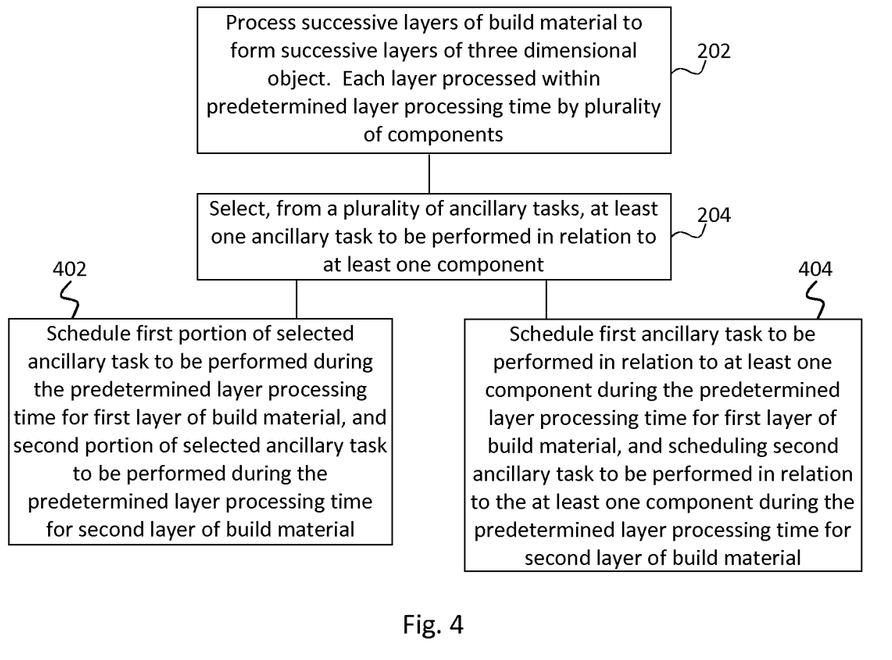
FIG. 4 is a flowchart of an example method of scheduling tasks to be performed.

FIG. 4 is a simplified schematic flow diagram of an example additive manufacturing process. The method comprises the processes of blocks 202 and 204 as described above. In block 402, the method may comprise scheduling, by at least one processor, a first portion of a selected ancillary task to be performed during the predetermined layer processing time for a first layer of build material, and a second portion of the selected ancillary task to be performed during the predetermined layer processing time for a second layer of build material. Thus, as described above, the selected ancillary task may be split or divided so that it can be performed without affecting the predetermined layer processing time.

In some examples, the method may comprise scheduling a first ancillary task to be performed in relation to at least one component during the predetermined layer processing time for a first layer of build material, and scheduling a second ancillary task to be performed in relation to the at least one component during the predetermined layer processing time for a second layer of build material. As described in an example below, the processor may, in this way, schedule various tasks to be performed to a single component or to multiple components over the course of a number of processing cycles of the additive manufacturing process.

In one example, an additive manufacturing apparatus may include an agent distributor having two sets of nozzles. It may be intended that each set of nozzles be primed regularly during the build process. However, there may not exist sufficient time in the inactive period of a single layer processing cycle to perform a priming procedure on both sets of nozzles. Thus, the processor may schedule the first set of nozzles to be primed during the inactive period of the agent distributor in a first processing cycle and the second set of nozzles to be primed during the inactive period in a second processing cycle. In this way, the processor can be considered to split or divide the task into smaller portions, each of which may be performed during an inactive period of the agent distributor in a single layer processing cycle.

Figure 5:
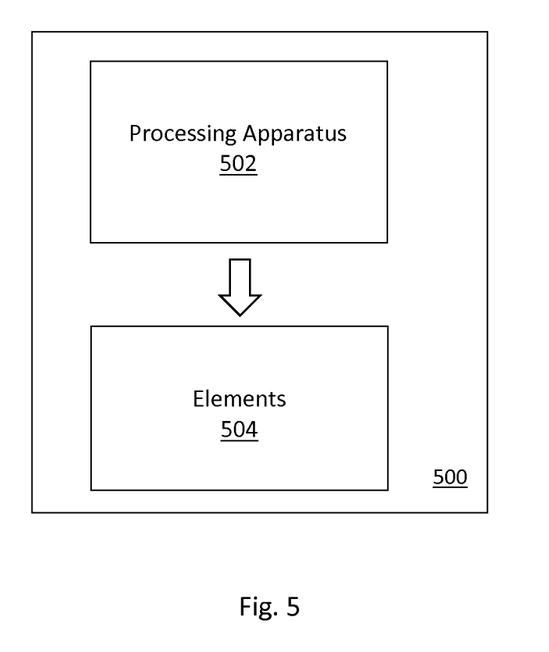
FIG. 5 is a simplified schematic of an example of apparatus for selecting a task to be performed.

FIG. 5 shows an apparatus 500 having a processing apparatus 502. The processing apparatus may, for example, comprise at least one processor. The apparatus 500 may also include a plurality of elements 504 to function in an additive manufacturing process. The elements 504 may be at least partially controlled by, and/or may receive instructions or data from, the processing apparatus 502. As discussed above, the elements 504 may function in relation to the generation of a slice of a three-dimensional object to be generated in an additive manufacturing process. The processing apparatus 502 may control the plurality of elements 504 to generate a three-dimensional object in a layer-by-layer manner by processing successive layers of build material, each layer of build material being processed within a predetermined layer processing time. The processing apparatus 502 may control the apparatus 500 to perform at least one ancillary task in relation to at least one element of the plurality of elements in accordance with a schedule, the ancillary task being performed within the predetermined layer processing time during the processing of a single layer or a plurality of layers. The processing apparatus 502 may control the apparatus 500 to perform the selected ancillary task in relation to the at least one element 504 during an inactive period of the at least one element.

The processing apparatus 502 may, in some examples, be to determine, based on data relating to the at least one element 504, whether the ancillary task is to be performed.

Figure 6:
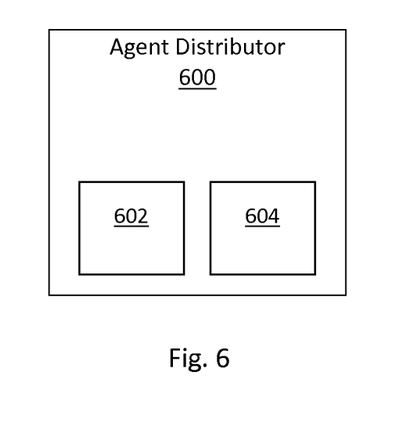
FIG. 6 is a simplified schematic of an example of agent distributor.

FIG. 6 shows an example in which the at least one element 504 comprises an agent distributor 600 to deliver an agent to a portion of a layer of build material in a pattern representing a slice of a three-dimensional object to be generated. The agent distributor 600, in some examples, may include a first set of nozzles 602 and a second set of nozzles 604. The processing apparatus 502 may control the apparatus 500 to perform an ancillary task on the first set of nozzles 602 within the predetermined layer processing time for a first layer of build material and to perform the ancillary task on the second set of nozzles 604 within the predetermined layer processing time for a second layer of build material.

Figure 7:
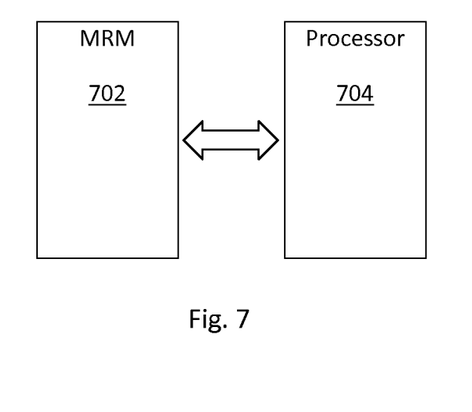
FIG. 7 is a simplified schematic of an example machine readable medium with a processor.

FIG. 7 shows a machine readable medium 702 associated with a processor 704. The machine readable medium 702 comprises instructions which, when executed by the processor 704, cause the processor 704 to control a plurality of components of an additive manufacturing apparatus to process successive layers of build material, the additive manufacturing apparatus for generating a three-dimensional object in a layer-by-layer process, wherein each layer of build material is processed within a predefined layer processing time; and control the apparatus to perform at least one maintenance operation in relation to at least one component of the plurality of components, in accordance with a maintenance operation plan. The maintenance operation plan is such that the at least maintenance operation is completed within the predefined layer processing time for a single layer of build material or for multiple layers of build material. Such a maintenance operation may, in some examples, include any operation or task that may assist with maintaining the additive manufacturing apparatus.

The processes discussed herein may, in some examples, each be performed by a separate processor or processing apparatus. In other examples, the processes may be performed by a single processor or processing apparatus. In some other examples, the processing may be shared among multiple processors.

Examples in the present disclosure can be provided as methods, apparatus, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus, functions of the apparatus may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method of controlling an additive manufacturing apparatus to generate a three dimensional object, the method comprising:

processing portions of successive layers of build material to cause the portions to coalesce so as to form successive layers of a three dimensional object, wherein the processing of the portions of each layer is performed within a predetermined layer processing time duration and includes forming a layer of powder and selectively solidifying the portions using a plurality of different types of components that each performs a different processing function;

selecting, by at least one processor, from a plurality of ancillary tasks, at least one ancillary task to be performed in relation to at least one component of the plurality of different types of components;

scheduling, by at least one processor, the at least one ancillary task to be performed in relation to the at least one component within the predetermined layer processing time duration for a single layer or for multiple layers of the build material; and performing the at least one ancillary task in accordance with said scheduling.

2. The method of claim 1, wherein said scheduling comprises:

scheduling, by at least one processor, a first portion of a selected ancillary task to be performed during the predetermined layer processing time duration for a first layer of build material, and a second portion of the selected ancillary task to be performed during the predetermined layer processing time duration for a second layer of build material.

3. The method of claim 1, wherein each component performs a function in relation to processing the portions of a layer of build material during an active period of the component;

wherein selectively solidifying the portions of a layer includes applying a coalescence agent and applying energy to the layer; and, wherein said scheduling comprises scheduling the at least one ancillary task to be performed during an inactive period of the component.

4. The method of claim 3, further comprising:

calculating, by at least one processor, for a layer of build material to be processed, a duration of said inactive period and selecting the ancillary task based at least in part on the calculated duration.

5. The method of claim 1, further comprising:

receiving data relating to at least one component; and determining, by at least one processor, based at least in part on said received data relating to the at least one component, whether the selected at least one ancillary task is to be performed.

6. The method of claim 5, wherein, in response to a determination that the selected at least one ancillary task is not to be performed, determining, by at least one processor, whether an alternative ancillary task is to be performed.

7. The method of claim 1, wherein said scheduling comprises:

scheduling a first ancillary task to be performed in relation to at least one component during the predetermined layer processing time duration for a first layer of build material, and scheduling a second ancillary task to be performed in relation to the at least one component during the predetermined layer processing time duration for a second layer of build material.

8. The method of claim 1, wherein said selecting at least one ancillary task is based at least in part on data relating to the three dimensional object to be generated.

9. The method of claim 8, wherein said data relating to the object to be generated comprises data selected from a group comprising: a size of at least a portion of the object to be generated, a shape of at least a portion of the object to be generated, a dimension of the object to be generated, a size of at least a portion of the layer of build material used to generate a slice of the object, a shape of at least a portion of the layer of build material used to generate a slice of the object, and an amount of print agent to be distributed onto at least a portion of a layer of build material.

10. The method of claim 1, wherein the plurality of ancillary tasks comprises at least one ancillary task selected from a group comprising: actively cooling an agent distributor of the additive manufacturing apparatus, performing a wiping procedure on at least one nozzle of an agent distributor of the additive manufacturing apparatus performing a drop spitting procedure on at least one nozzle of an agent distributor of the additive manufacturing apparatus, performing a drop detection procedure on at least one nozzle of an agent distributor of the additive manufacturing apparatus, priming an agent distributor of the additive manufacturing apparatus, priming at least one nozzle of an agent distributor of the additive manufacturing apparatus, and performing a cleaning procedure to a build material distributor of the additive manufacturing apparatus.

11. Apparatus comprising:

a plurality of different types of components to perform different functions in an additive manufacturing process; and processing apparatus to:

control the plurality of components to generate a three-dimensional object in a layer-by-layer manner by processing portions of successive layers of build material including forming a layer of powder and selectively solidifying the portions to cause the portions to coalesce, the portions of each layer of build material being processed within a predetermined layer processing time duration; and control the apparatus to perform at least one ancillary task in relation to at least one component of the plurality of components in accordance with a schedule, the ancillary task being performed within the predetermined layer processing time duration during the processing of a single layer or a plurality of layers.

12. Apparatus according to claim 11, wherein the processing apparatus is to determine, based on data relating to the at least one element, whether said ancillary task is to be performed.

13. Apparatus according to claim 11, wherein the at least one component comprises an agent distributor to deliver an agent to a portion of a layer of build material in a pattern representing a slice of the three-dimensional object to be generated, wherein the agent distributor comprises a first set of nozzles and a second set of nozzles, and wherein the processing apparatus is to control the apparatus to perform an ancillary task on the first set of nozzles within the predetermined layer processing time duration for a first layer of build material and to perform the ancillary task on the second set of nozzles within the predetermined layer processing time duration for a second layer of build material.

14. A non-transitory machine readable storage medium containing instructions which, when executed by a processor, cause the processor to:

control a plurality of different types of components that each performs a different processing function of an additive manufacturing apparatus to process portions of successive layers of build material including forming a layer of powder and selectively solidifying the portions to cause the portions to coalesce, the additive manufacturing apparatus for generating a three-dimensional object in a layer-by-layer process, wherein each layer of build material is processed within a predefined layer processing time duration; and control the apparatus to perform at least one maintenance operation in relation to at least one component of the plurality of components, in accordance with a maintenance operation plan;

wherein the maintenance operation plan is such that the at least maintenance operation is completed within the predefined layer processing time duration for a single layer of build material or for multiple layers of build material.

\* \* \* \* \*